(12) United States Patent
Reding

(10) Patent No.: US 12,341,368 B1
(45) Date of Patent: Jun. 24, 2025

(54) CORDLESS POWER TOOLS BATTERY ADAPTER

(71) Applicant: John C. Reding, Chisago City, MN (US)

(72) Inventor: John C. Reding, Chisago City, MN (US)

( * ) Notice: Subject to any disclaimer, the term of this patent is extended or adjusted under 35 U.S.C. 154(b) by 848 days.

(21) Appl. No.: 17/567,087

(22) Filed: Dec. 31, 2021

Related U.S. Application Data

(60) Provisional application No. 63/132,494, filed on Dec. 31, 2020.

(51) Int. Cl.
*H02J 7/00* (2006.01)

(52) U.S. Cl.
CPC ........ *H02J 7/0045* (2013.01); *H02J 7/00047* (2020.01); *H02J 7/0048* (2020.01); *H02J 2207/20* (2020.01)

(58) Field of Classification Search
CPC .... H02J 7/0045; H02J 7/00047; H02J 7/0048; H02J 2207/20
USPC .......................................................... 320/110
See application file for complete search history.

(56) References Cited

U.S. PATENT DOCUMENTS

| | | | | |
|---|---|---|---|---|
| 8,169,185 B2* | 5/2012 | Partovi | ................. | H01F 27/366 |
| | | | | 320/108 |
| 10,651,664 B2* | 5/2020 | Sergyeyenko | ........ | H02J 7/0045 |
| 11,540,429 B2* | 12/2022 | Silha | ...................... | H02J 7/0013 |
| 2006/0091858 A1* | 5/2006 | Johnson | ................ | H02J 7/0034 |
| | | | | 320/128 |
| 2007/0024237 A1* | 2/2007 | Cole, Jr. | ................ | A45C 15/00 |
| | | | | 320/107 |
| 2007/0278996 A1* | 12/2007 | So | ........................ | H01R 13/447 |
| | | | | 320/107 |
| 2008/0018303 A1* | 1/2008 | Scheucher | ............ | B60L 53/305 |
| | | | | 320/128 |
| 2008/0174269 A1* | 7/2008 | DeRome | ............... | H02J 7/0049 |
| | | | | 320/112 |
| 2015/0171632 A1* | 6/2015 | Fry | ....................... | H02J 7/0047 |
| | | | | 307/22 |
| 2017/0117726 A1* | 4/2017 | Jore | ........................ | H02J 7/342 |

(Continued)

FOREIGN PATENT DOCUMENTS

| | | | | |
|---|---|---|---|---|
| CA | 3019441 A1 * | 6/2018 | ................ | B25F 5/00 |
| CA | 3220576 A1 * | 12/2022 | .......... | H01M 10/425 |

(Continued)

*Primary Examiner* — Suresh Memula
(74) *Attorney, Agent, or Firm* — JOHNSON AND PHUNG; Thomas N. Phung

(57) ABSTRACT

A cordless power tool battery pack adapter that includes a main body housing having a battery-free interior, a first and second end with the second end having a battery pack mounting surface located distal the first end, a circuit board supported within the main body housing and connected to the battery pack mounting surface and includes a voltage converter functioning to convert an input voltage supplied by an external power tool battery pack to a predetermined voltage, a push button reset circuit breaker located on an exterior surface of the main body housing, and at least one cigarette style auxiliary power tool receptacle located on the exterior surface of the main body housing and connected to the circuit board for receiving a cigarette style plug socket and powering a device connected to the socket when the battery pack is mounted to the main body housing.

18 Claims, 4 Drawing Sheets

(56) References Cited

U.S. PATENT DOCUMENTS

| | | | | |
|---|---|---|---|---|
| 2019/0067955 | A1* | 2/2019 | Sergyeyenko | H02J 7/0048 |
| 2019/0103805 | A1* | 4/2019 | Zhu | H02J 7/0063 |
| 2020/0301696 | A1* | 9/2020 | Yang | H01M 10/4257 |
| 2021/0376652 | A1* | 12/2021 | Luangrath | H02J 7/007182 |
| 2022/0200303 | A1* | 6/2022 | Swamy | H02J 7/0063 |
| 2024/0072554 | A1* | 2/2024 | Tesch | H02J 7/0048 |

FOREIGN PATENT DOCUMENTS

| | | | | | |
|---|---|---|---|---|---|
| CN | 108599343 | A | * | 9/2018 | H02J 7/0014 |
| CN | 222191857 | U | * | 12/2024 | |
| EP | 1523081 | A2 | * | 4/2005 | A45F 5/00 |
| EP | 4318867 | A2 | * | 2/2024 | G01R 31/371 |
| WO | WO-2008106450 | A1 | * | 9/2008 | H02J 7/0013 |
| WO | WO-2013169959 | A1 | * | 11/2013 | H01L 31/02 |

* cited by examiner

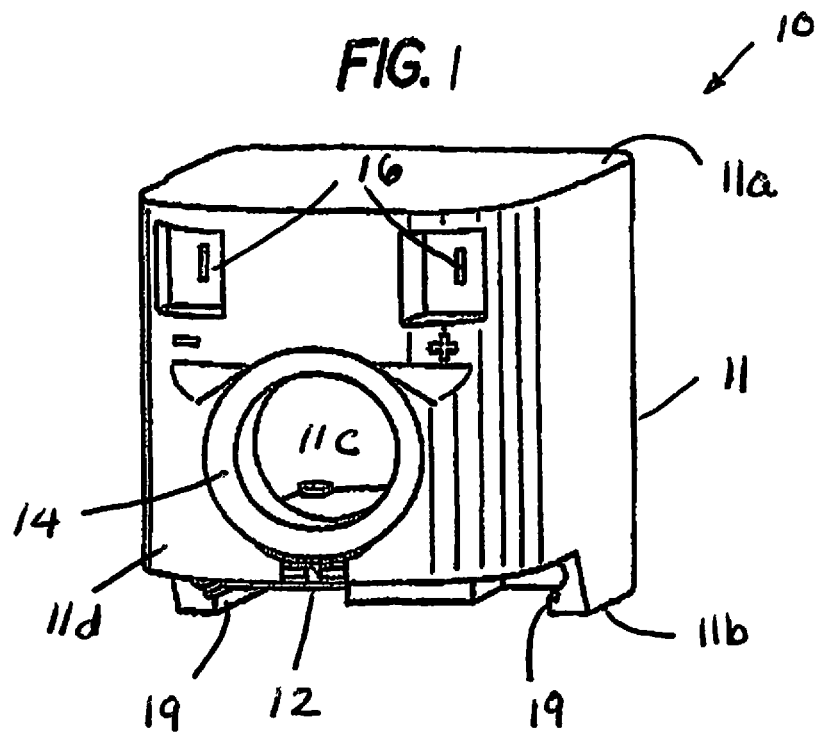
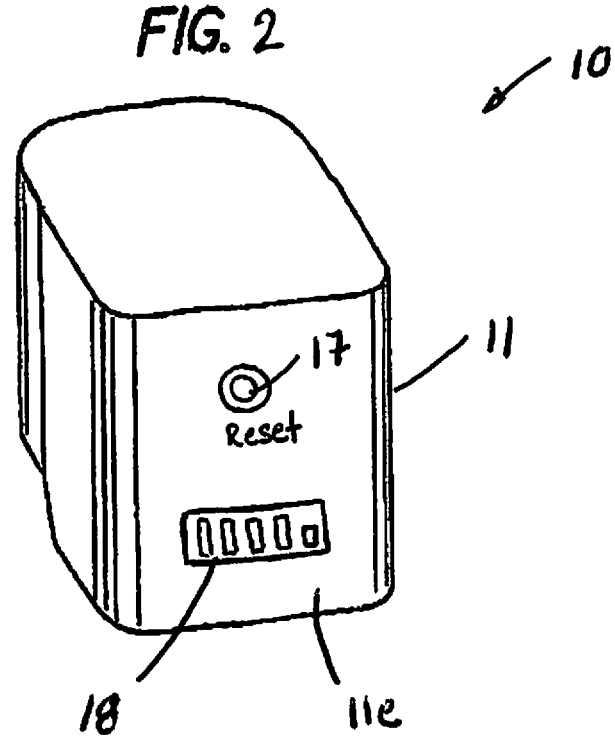

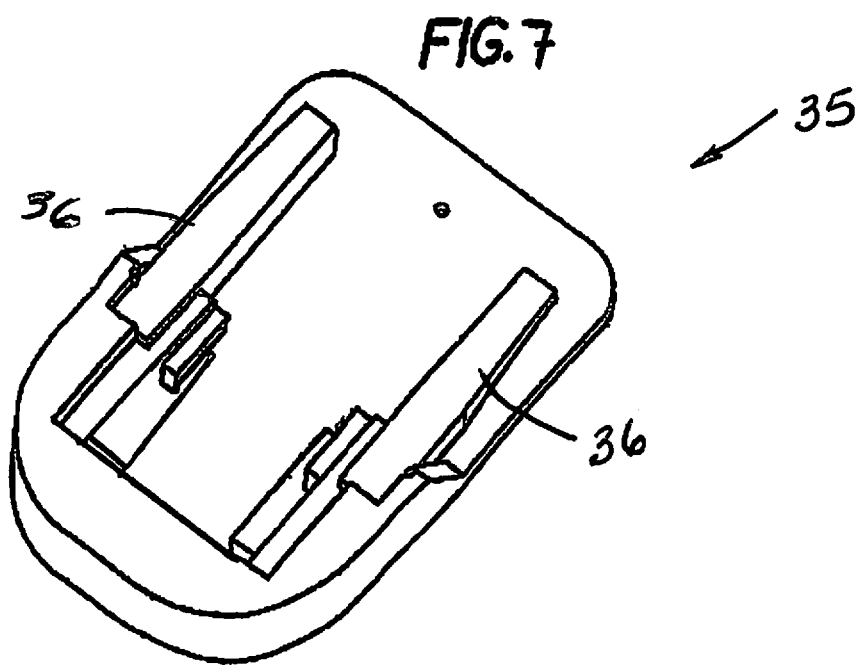

CORDLESS POWER TOOLS BATTERY ADAPTER

CROSS REFERENCE TO RELATED APPLICATIONS

This application claims priority to currently U.S. Provisional Application Ser. No. 63/132,494; filed on Dec. 31, 2020; CORDLESS POWER TOOLS BATTERY ADAPTER.

FIELD OF THE INVENTION

This invention relates generally to cordless power tools battery and, more specifically to a cordless power tools battery adapter for using a commercially available cordless power tools battery pack to provide a power source to everyday electrical devices.

STATEMENT REGARDING FEDERALLY SPONSORED RESEARCH OR DEVELOPMENT

None

REFERENCE TO A MICROFICHE APPENDIX

None

SUMMARY OF THE INVENTION

Briefly, the present invention comprises a weatherproof cordless power tool battery pack adapter that includes a main body housing having a battery-free interior, a first end and a second end with the second end having cordless power tool battery pack mounting surface located distal the first end. Located on the battery pack mounting surface are alignment guides configured to assist in slidably attaching and detaching a cordless external power tool battery pack to the mounting surface of the main body housing.

Supported within the main body housing is a circuit board connected to the battery pack mounting surface with the circuit board including a voltage converter functioning to convert an input voltage supplied by the external power tool battery pack to a predetermined voltage.

Located on an exterior surface of the main body housing is a push button reset circuit breaker, at least one cigarette style auxiliary power tool receptacle connected to the circuit board with the auxiliary power tool receptacle functioning to receive a cigarette style plug socket and powering a device connected to the socket when the cordless external power tool battery pack is mounted to the main body housing. Also located on the exterior surface of the main body housing is a positive and negative push-in power terminal connected to the circuit board and functioning to running 12 vdc devices when the cordless external power tool battery pack is mounted to the main body housing and an optional adapter release button located on the exterior surface of the main body housing and functioning to unlock the cordless external power tool battery pack from the main body housing.

BRIEF DESCRIPTION OF THE DRAWINGS

FIG. 1 is a front perspective view of a cordless power tool battery pack adapter of the present invention;

FIG. 2 is a back perspective view of the cordless power tool battery pack adapter of FIG. 1;

FIG. 7 is a bottom view showing an embodiment of a cordless power tool battery pack mounting surface.

DESCRIPTION OF THE PREFERRED EMBODIMENT

Figure 3:
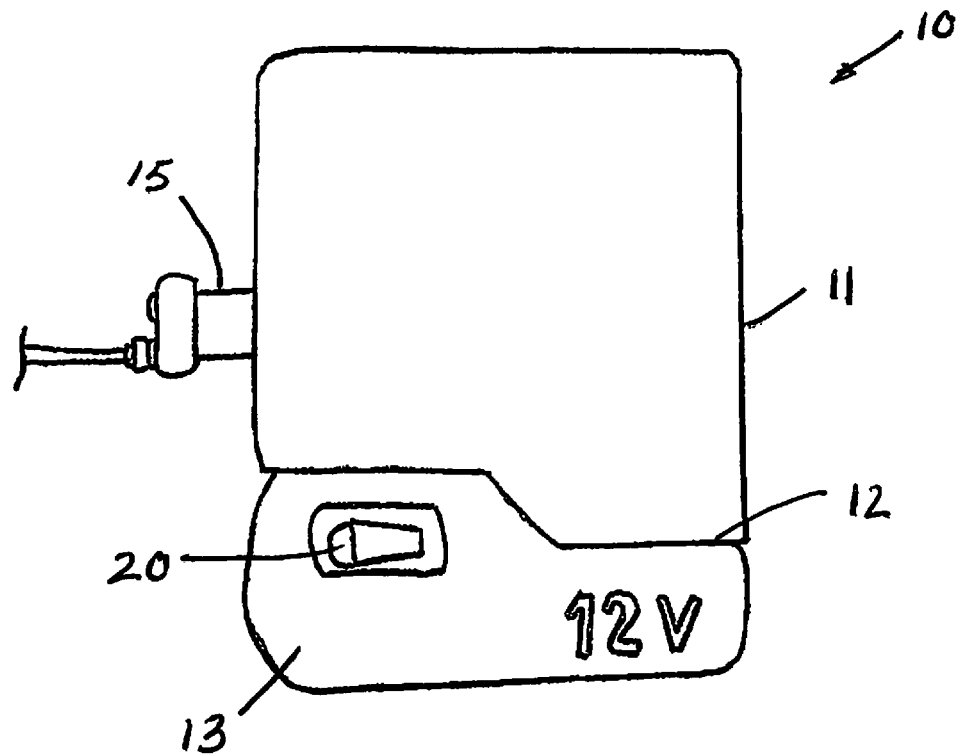
FIG. 3 is a side view showing the cordless power tool battery pack adapter of FIG. 1 having a cordless external power tool battery pack mounted to the main body housing.

The general purpose of the present invention, which will be described subsequently in greater detail, is directed to a cordless power tools battery adapter for using a commercially available cordless power tools battery pack to provide a power source to everyday electrical devices.

There has thus been outlined the more important features of the invention in order that the detailed description thereof that follows may be better understood, and in order that the present contribution to the art may be better appreciated. There are additional features of the invention that will be described hereinafter, and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the disclosing subject matter be regarded as including such equivalent constructions insofar as they do not depart from the spirit and scope of the present invention.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

In addition, the accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of any potential claims.

Referring to the drawings, FIG. 1 is a front perspective view and FIG. 2 is a back perspective view each showing an embodiment of a cordless power tool battery pack adapter 10 of the present invention. FIG. 3 is a side view showing the cordless power tool battery pack adapter 10 of FIGS. 1 and 2 having a cordless external power tool battery pack 13 mounted to the main body housing 11.

Cordless power tool battery pack adapter 10 is preferably weatherproof and generally includes a main body housing 11 having a battery-free interior 11c, a first end 11a and a second end 11b with the second end 11b having an external cordless power tool battery pack mounting surface 12 located distal the first end 11a of a main body housing 11. The main body housing 11 may be made from plastics, such as PLA, ABS, PETg, other plastics or other materials made from metals such as aluminum, steel, or alloys.

In regard to the external cordless power tool battery pack mounting surface 12, it is noted that the main body housing 11 of the cordless power tool battery pack adapter may comprise different the mounting surfaces that correspond to the mounting surfaces of the cordless external power tool battery pack of different manufacturers such as but not limited to Ridgid®, Milwaukee®, DeWalt®, Makita®, Black & Decker®, Ryobi® and other manufacturers of cordless tools with voltages within specified ranges.

Although not shown, the cordless power tool battery pack adapter 10 includes a circuit board supported within the interior 11c of the main body housing 11 with the circuit board connected to the battery pack mounting surface 12. The circuit board includes a voltage converter functioning to convert an input voltage supplied by an external power tool battery pack to a predetermined voltage.

The cordless power tool battery pack adapter 10 may include a voltage converter that steps down for example 14-40 vdc to 11-15 vdc for the purpose to run 12-volt direct current appliances and devices with a draw of up to 15 amps. Example of suitable circuit board features include but is not limited to a DC-DC 300 W 20A Constant Current Adjustable step-down module Buck Converter DC 6-40V Power Voltage Board Short Circuit Protection and a wide input voltage range from 6V to 40V, the step-down converter can accurately adjust output voltage and current. The efficiency can be up to 96%, measured at 20A, converting 24V to 12V.

Located on an exterior surface of a front side 11d of the main body housing 11 is an automobile or cigarette style auxiliary power tool receptacle 14, which is connected to the circuit board. Referring to FIG. 3, the auxiliary power tool receptacle 14 functions to receive a cigarette style plug socket 15 and power a device connected to the socket when the cordless external power tool battery pack 13 is mounted to the main body housing 11.

Also shown located on the exterior surface of the front side 11d of the main body housing 11 is a set of positive and negative push-in power terminals 16 connected to the circuit board. The set of positive and negative push-in power terminals 16 functioning to run 12 vdc devices when the cordless external power tool battery pack 13 is mounted to the main body housing 11.

Referring to FIG. 2, located on the exterior surface of a back side 11e of the main body housing 11 is a push button reset circuit breaker 17 located on an exterior surface of said main body housing and a battery pack power level indicator 18 providing visual indicator of a current charge of the cordless external power tool battery pack 13 attached to the main body housing 11.

Although alternative embodiments of the present invention may include the cordless external power tool battery pack mounted to the main body housing in various ways, in the embodiment of FIGS. 1-3, the cordless external power tool battery pack 13 is shown mounted to the cordless power tool battery pack adapter 10 slidably attached to and detached from the mounting surface 12 of the main body housing 11. For example, the mounting surface 12 of the main body housing 11 may include alignment guides 19 configured to assist in slidably attaching and detaching the cordless external power tool battery pack 13 to the mounting surface 12 of the main body housing 11.

Once the cordless external power tool battery pack 13 is attached to the main body housing 11, the cordless external power tool battery pack 13 may be lockingly secured to the main body housing 11 to prevent accidental displacement or detachment of the cordless external power tool battery pack 13 with respect to the main body housing 11. When desired, the cordless external power tool battery pack 13 may be unlocked from the main body housing 11 by user engagement of an optional battery mounting release button 20 shown located on cordless external power tool battery pack 13.

Figure 4:
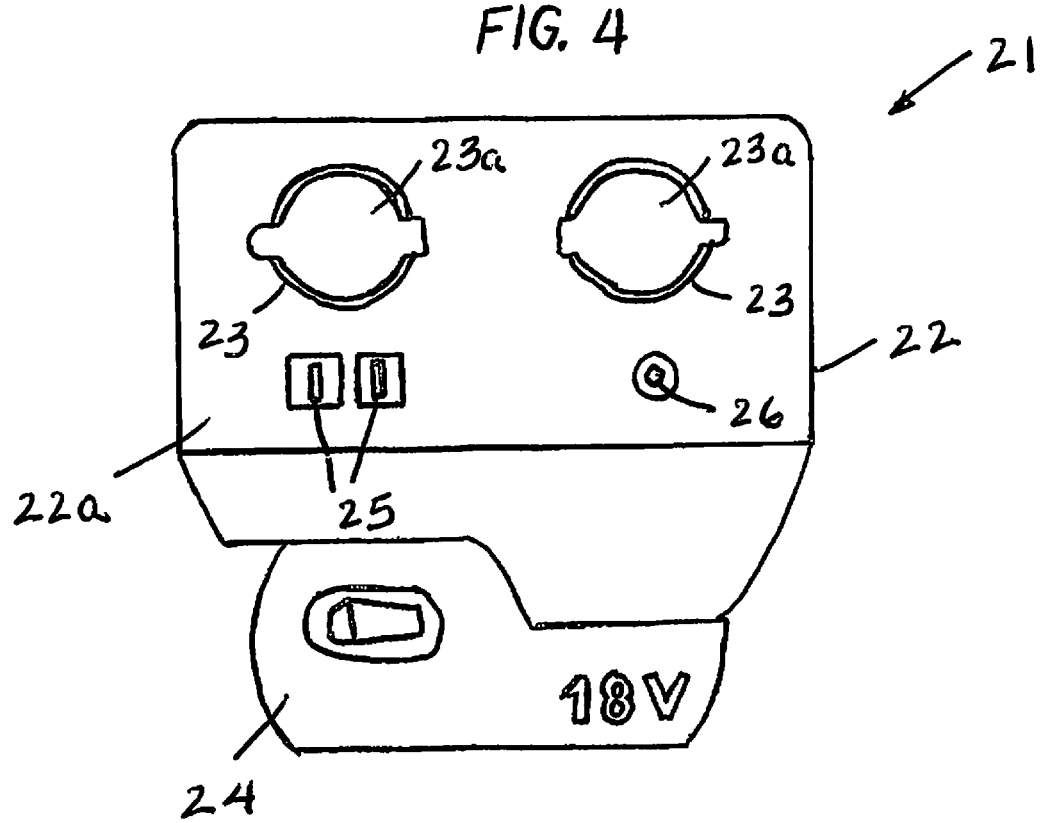
FIG. 4 is a front view showing a weatherproof cordless power tool battery pack adapter having a pair of cigarette style auxiliary power tool receptacles.
Figure 5:
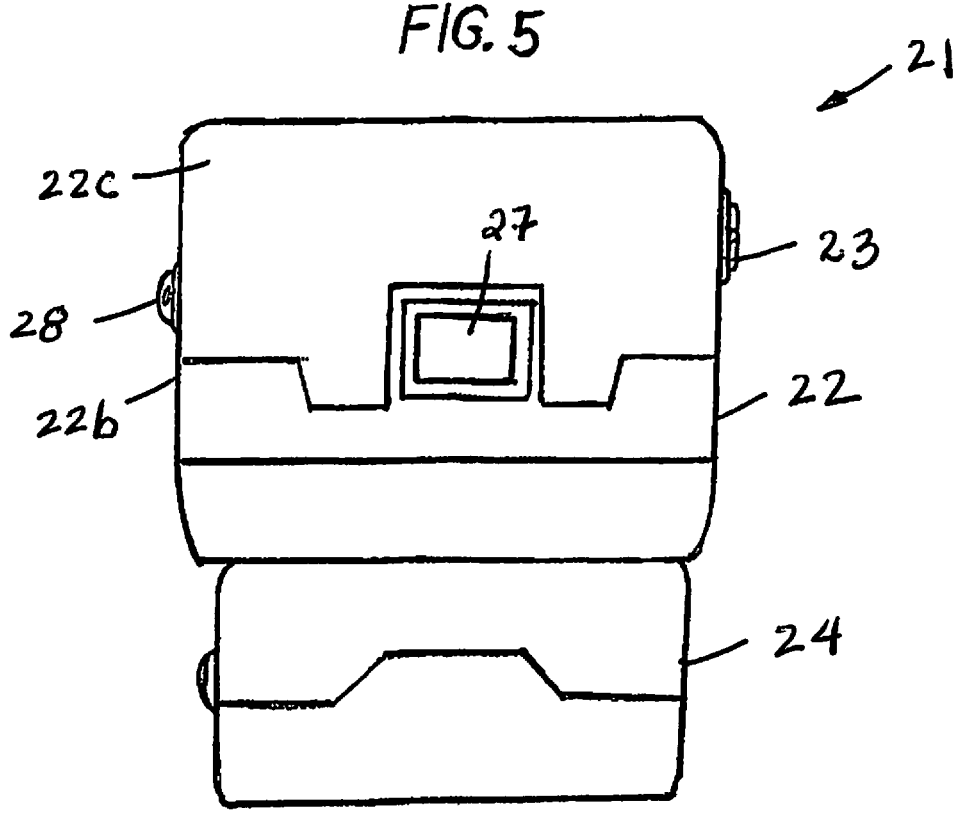
FIG. 5 is a left side view of the weatherproof cordless power tool battery pack adapter of FIG. 4.

FIG. 4 is a front view and FIG. 5 is a left side view showing an alternative embodiment of a weatherproof cordless power tool battery pack adapter 21 of the present invention having similar general components with the cordless power tool battery pack adapter 10 of FIGS. 1-3. However, unlike the cordless power tool battery pack adapter 10 of FIGS. 1-3, cordless power tool battery pack adapter 21 includes a pair of cigarette style auxiliary power tool receptacles located on an exterior surface of a front side 22a of a main body housing 22 with the pair of cigarette style auxiliary power tool receptacles 23 each connected to a circuit board supported within an interior of the main body housing 22.

Similar to the cordless power tool battery pack adapter 10 of FIGS. 1-3, the auxiliary power tool receptacles 23 each function to receive a cigarette style plug socket 15 and powering a device connected to the socket 15 when a cordless external power tool battery pack 24 is mounted to the main body housing 22. In order to assist in the weatherproof of the cordless power tool battery pack adapter 21, each of the auxiliary power tool receptacles 23 includes a weather-tight cover 23a to protect the corresponding auxiliary power tool receptacles 23 from the elements when not in use. Also shown In FIG. 4 is a set of positive and negative push-in power terminals 25 and a push button reset circuit breaker 26 both located on the front side 22a of the main body housing 22. Similar to the cordless power tool battery pack adapter 10 of FIGS. 1-3, the push-in power terminals 24 are connected to the circuit board and functions to run 12 vdc devices when the cordless external power tool battery pack 24 is mounted to the main body housing 22.

The weatherproof cordless power tool battery pack adapter 21 of FIGS. 4 and 5 also include an adapter release button 27 shown located on the exterior surface of a left side 22c of the main body housing 22 with the adapter release button 27 functioning to unlock the cordless external power tool battery pack 24 from the main body housing 22. FIG. 5 also shows weatherproof cordless power tool battery pack adapter 21 having an optional adapter power on/off switch 28 located on a backside 22b of the main body housing 22.

Figure 6:
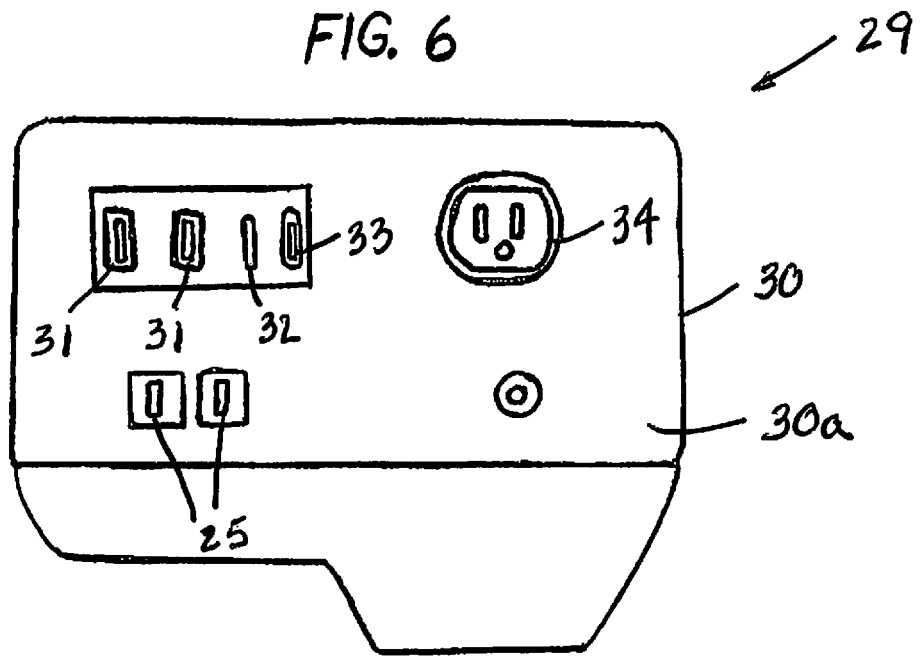
FIG. 6 is a front view showing a weatherproof cordless power tool battery pack adapter having various ports and a 120 Volt receptacle.

FIG. 6 is a front view showing an alternative embodiment of a weatherproof cordless power tool battery pack adapter 29 of the present invention having similar general components with the cordless power tool battery pack adapter 21 of FIGS. 4-5.

However, cordless power tool battery pack adapter 29 is show including a pair of female universal serial bus (USB) port 31, a lightning connector port 32, a Thunderbolt® port 33, and a 120 Volt receptacle 34 located on the exterior surface of a front side 30*a* of a main body housing 30 and connected to the circuit board for powering corresponding devices that are connected to the aforementioned ports when the cordless external power tool battery pack 13, 24 is mounted to the main body housing 30. The aforementioned ports may function for charging and running all types of 5v USB devices, phones, fans, lights, and other USB capable powered devices. For example, one USB port may be 3.0 capable of fast charging phones and delivering up to 2.5 amps at 5 vdc. Includes a circuit breaker for amp overdraw protection.

FIG. 7 is a bottom view showing an embodiment of a cordless power tool battery pack mounting surface 35. The cordless power tool battery pack mounting surface 35 is shown having corresponding alignment guides 36 configured to assist in mating with a corresponding mounting surface of a specific manufacturer's cordless external power tool battery pack and slidably mounting a cordless external power tool battery pack to or slidably detaching the cordless external power tool battery pack from a weatherproof cordless power tool battery pack adapter.

Although the embodiments of FIGS. 1-6 each shows the weatherproof cordless power tool battery pack adapter 10, 21 and 29 with main body housings 11, 22, and 30 and cordless power tool battery pack mounting surface 12 comprising a one-piece unit, cordless power tool battery pack mounting surface 35 may alternatively be detachable from a main body housing a weatherproof cordless power tool battery pack adapter and replaced with a second cordless power tool battery pack mounting surface having alignment guides of different shapes, sizes and/or positioning for mounting with a cordless power tool battery pack produced by a different manufacturer.

Although not shown, alternative embodiments of the weatherproof cordless power tool battery pack adapter of the present invention may include a USB LED light with the cordless power tools battery adapter or have a LED light with switch built into the main body of the cordless power tools battery adapter. If included the LED light may be removable from the main body housing of the weatherproof cordless power tool battery pack adapter.

I claim:

1. A cordless power tool battery pack adapter comprising:
   a main body housing having a battery-free interior, a first end and a second end with said second end having an external cordless power tool battery pack mounting surface located distal said first end, said cordless power tool battery pack mounting surface detachable from said main body housing and replaced with a second cordless power tool battery pack mounting surface mountable with a cordless power tool battery pack produced by a different manufacturer;
   a circuit board supported within said main body housing, said circuit board connected to said battery pack mounting surface and includes a voltage converter functioning to convert an input voltage supplied by an external power tool battery pack to a predetermined voltage;
   a push button reset circuit breaker located on an exterior surface of said main body housing; and
   at least one cigarette style auxiliary power tool receptacle located on said exterior surface of said main body housing and connected to said circuit board, said auxiliary power tool receptacle functioning to receive a cigarette style plug socket and powering a device connected to said socket when said cordless external power tool battery pack is mounted to said main body housing.

2. The cordless power tool battery pack adapter of claim 1 including a positive and negative push-in power terminal located on said exterior surface of said main body housing and connected to said circuit board and functioning to run 12 vdc devices when said cordless external power tool battery pack is mounted to said main body housing.

3. The cordless power tool battery pack adapter of claim 2 wherein said cordless external power tool battery pack is slidably attached to and detached from said mounting surface of said main body housing.

4. The cordless power tool battery pack adapter of claim 3 wherein said battery pack mounting surface of said main body housing includes alignment guides configured to assist in slidably attaching and detaching said cordless external power tool battery pack to said mounting surface of said main body housing.

5. The cordless power tool battery pack adapter of claim 4 including adapter release button located on said exterior surface of said main body housing with said adapter release button functioning to unlock said cordless external power tool battery pack from said main body housing.

6. The cordless power tool battery pack adapter of claim 4 wherein said at least one cigarette style auxiliary power tool receptacle comprises a pair of cigarette style auxiliary power tool receptacle located on said exterior surface of said main body housing and connected to said circuit board.

7. The cordless power tool battery pack adapter of claim 1 including a female universal serial bus (USB) port, a lightning connector port, a Thunderbolt®, or their various combinations located on said exterior surface of said main body housing and connected to said circuit board.

8. The cordless power tool battery pack adapter of claim 1 including a 120 Volt receptacle located on said exterior surface of said main body housing and connected to said circuit board.

9. The cordless power tool battery pack adapter of claim 1 including a battery pack power level indicator providing visual indicator of a current charge of the battery pack attached to said main body housing.

10. The cordless power tool battery pack adapter of claim 1 wherein said main body housing comprises a weatherproof main body housing.

11. A weatherproof cordless power tool battery pack adapter comprising:
    a main body housing having a battery-free interior, a first end and a second end with said second end having an external cordless power tool battery pack mounting surface located distal said first end, said cordless power tool battery pack mounting surface detachable from said main body housing and replaced with a second cordless power tool battery pack mounting surface mountable with a cordless power tool battery pack produced by a different manufacturer;
    alignment guides located on said battery pack mounting surface and configured to assist in slidably attaching and detaching a cordless external power tool battery pack to said mounting surface of said main body housing;

a circuit board supported within said main body housing, said circuit board connected to said battery pack mounting surface and includes a voltage converter functioning to convert an input voltage supplied by said external power tool battery pack to a predetermined voltage;

a push button reset circuit breaker located on an exterior surface of said main body housing;

at least one cigarette style auxiliary power tool receptacle located on said exterior surface of said main body housing and connected to said circuit board, said auxiliary power tool receptacle functioning to receive a cigarette style plug socket and powering a device connected to said socket when said cordless external power tool battery pack is mounted to said main body housing;

a positive and negative push-in power terminal located on said exterior surface of said main body housing and connected to said circuit board and functioning to run 12 vdc devices when said cordless external power tool battery pack is mounted to said main body housing; and an adapter release button located on the exterior surface of said main body housing and functioning to unlock said cordless external power tool battery pack from said main body housing.

12. The weatherproof cordless power tool battery pack adapter of claim 11 wherein said at least one cigarette style auxiliary power tool receptacle comprises a pair of cigarette style auxiliary power tool receptacle located on said exterior surface of said main body housing and connected to said circuit board.

13. The weatherproof cordless power tool battery pack adapter of claim 11 including a female universal serial bus (USB) port, a lightning connector port, a Thunderbolt®, or their various combinations located on said exterior surface of said main body housing and connected to said circuit board.

14. The weatherproof cordless power tool battery pack adapter of claim 11 including a 120 Volt receptacle located on said exterior surface of said main body housing and connected to said circuit board.

15. The weatherproof cordless power tool battery pack adapter of claim 11 including a battery pack power level indicator providing visual indicator of a current charge of the battery pack attached to said main body housing.

16. A weatherproof cordless power tool battery pack adapter comprising:

a main body housing having a battery-free interior, a first end and a second end with said second end having an external cordless power tool battery pack mounting surface located distal said first end, said cordless power tool battery pack mounting surface detachable from said main body housing and replaced with a second cordless power tool battery pack mounting surface mountable with a cordless power tool battery pack produced by a different manufacturer;

alignment guides located on said battery pack mounting surface and configured to assist in slidably attaching and detaching a cordless external power tool battery pack to said mounting surface of said main body housing;

a circuit board supported within said main body housing, said circuit board connected to said battery pack mounting surface and includes a step-down DC-to-DC voltage converter functioning to convert an input voltage supplied by said external power tool battery pack to a predetermined voltage;

a push button reset circuit breaker located on an exterior surface of said main body housing;

a pair of cigarette style auxiliary power tool receptacles located on said exterior surface of said main body housing and connected to said circuit board, said auxiliary power tool receptacles each functioning to receive a cigarette style plug socket and powering a device connected to said socket when said cordless external power tool battery pack is mounted to said main body housing;

a positive and negative push-in power terminal located on said exterior surface of said main body housing and connected to said circuit board and functioning to run 12 vdc devices when said cordless external power tool battery pack is mounted to said main body housing; and an adapter release button located on the exterior surface of said main body housing and functioning to unlock said cordless external power tool battery pack from said main body housing.

17. The weatherproof cordless power tool battery pack adapter of claim 16 including having an adapter power on/off switch located on the exterior surface of the main body housing.

18. The weatherproof cordless power tool battery pack adapter of claim 17 including a female universal serial bus (USB) port, a lightning connector port, a Thunderbolt®, a 120 Volt receptacle or their various combinations located on said exterior surface of said main body housing and connected to said circuit board.

* * * * *